US006374145B1

(12) United States Patent
Lignoul

(10) Patent No.: US 6,374,145 B1
(45) Date of Patent: Apr. 16, 2002

(54) PROXIMITY SENSOR FOR SCREEN SAVER AND PASSWORD DELAY

(75) Inventor: Mark Lignoul, 717 Oak La., Grapevine, TX (US) 76051

(73) Assignee: Mark Lignoul, Grapevine, TX (US)

( * ) Notice: Subject to any disclaimer, the term of this patent is extended or adjusted under 35 U.S.C. 154(b) by 0 days.

(21) Appl. No.: 09/211,091

(22) Filed: Dec. 14, 1998

(51) Int. Cl.[7] .......................... G05B 15/00; G06F 11/30; G06F 19/00
(52) U.S. Cl. ........................... 700/17; 700/83; 700/302; 703/23; 713/200; 713/203; 345/867
(58) Field of Search .............................. 700/17, 59, 66, 700/83, 306, 65, 84, 85, 302; 348/156, 154, 155; 713/202, 323; 703/21, 23, 24, 26; 345/158, 867; 708/135; 710/18

(56) References Cited

U.S. PATENT DOCUMENTS

| 4,433,309 A | 2/1984 | Hermle et al. ................. 331/65 |
| 4,449,122 A | 5/1984 | Whitmer ...................... 340/562 |
| 4,454,594 A | 6/1984 | Heffron et al. ............. 713/200 |
| 4,682,159 A | 7/1987 | Davison ...................... 345/158 |
| 4,685,056 A | 8/1987 | Barnsdale, Jr. et al. ..... 711/164 |
| 4,698,748 A | 10/1987 | Juzswik et al. ............. 713/322 |
| 4,742,191 A | 5/1988 | Coleman et al. .......... 200/52 R |
| 4,825,209 A | 4/1989 | Sasaki et al. .......... 340/825.72 |
| 4,886,941 A | 12/1989 | Davis et al. ............. 178/19.01 |
| 5,019,804 A | 5/1991 | Fraden ........................ 340/562 |
| 5,059,961 A | 10/1991 | Cheng .......................... 345/10 |
| 5,063,306 A | 11/1991 | Edwards ...................... 327/77 |
| 5,270,710 A | 12/1993 | Gaultier et al. ................ 341/33 |
| 5,315,884 A | 5/1994 | Kronberg .................. 73/862.68 |
| 5,329,471 A * | 7/1994 | Swoboda et al. ............. 703/13 |
| 5,377,269 A | 12/1994 | Heptig et al. ................ 713/202 |
| 5,380,983 A | 1/1995 | Cavada et al. .............. 219/250 |
| 5,396,443 A | 3/1995 | Mese et al. ................. 713/321 |
| 5,404,541 A | 4/1995 | Hirosawa et al. ........... 713/324 |

(List continued on next page.)

OTHER PUBLICATIONS

Microsoft Press Computer Dictionary 1997, Microsoft Press, third edition, p. 272.*
Article entitled, "The Universal Serial Bus from Abstraction to Implementation", by Mohammed Fennich, Intel Corporation.
IBM Personal System/2 Mouse Technical Reference, second edition, Jun. 1989, IBM Corporation.
Data Handbook IC20, 80C51—Based, 8–Bit Microcontrollers, Aug. 1996, Phillips Semiconductors.

*Primary Examiner*—William Grant
*Assistant Examiner*—Paul Rodriquez
(74) *Attorney, Agent, or Firm*—J. Robert Brown, Jr.; Hunton & Williams

(57) ABSTRACT

Apparatuses and methods of the present invention provide improved control over the activation and deactivation of a computer program. For example, the computer program may be a screen saver program and/or a password protection program. The computer program is prevented from being activated when the user has not recently provided input to a computer system via an input-output device, but the user is still in the vicinity of the computer system. When no person is detected in the vicinity, the present invention allows the computer program's activation to be controlled using standard known methods. In one embodiment, the present invention provides enhanced screen saver activation and deactivation control without the need to modify existing computer hardware or software. Embodiments of modified computer hardware and software systems are also provided where it is desirable to integrate enhanced screen saver activation and deactivation control into a hardware or software system. Other aspects of the present invention deal with program activation control, user authentication, and methods for providing the most economical implementations.

20 Claims, 3 Drawing Sheets

U.S. PATENT DOCUMENTS

| | | | |
|---|---|---|---|
| 5,448,262 A | 9/1995 | Lee et al. | 345/212 |
| 5,465,366 A | 11/1995 | Heineman | 713/310 |
| 5,471,616 A * | 11/1995 | Johnson et al. | 713/200 |
| 5,548,763 A | 8/1996 | Combs et al. | 713/323 |
| 5,548,764 A | 8/1996 | Duley et al. | 713/310 |
| 5,578,991 A * | 11/1996 | Scholder | 340/571 |
| 5,590,315 A | 12/1996 | Hess et al. | 703/25 |
| 5,606,615 A | 2/1997 | Lapointe et al. | 713/185 |
| 5,640,537 A * | 6/1997 | Jessen et al. | 345/733 |
| 5,642,185 A | 6/1997 | Altrich, III et al. | 399/81 |
| 5,669,004 A | 9/1997 | Sellers | 713/324 |
| 5,675,364 A | 10/1997 | Stedman et al. | 345/211 |
| 5,675,510 A | 10/1997 | Coffey et al. | 709/224 |
| 5,675,810 A | 10/1997 | Sellers | 713/323 |
| 5,682,550 A | 10/1997 | Brown et al. | 710/10 |
| 5,689,715 A | 11/1997 | Crump et al. | 713/310 |
| 5,715,464 A | 2/1998 | Crump et al. | 713/323 |
| 5,736,976 A | 4/1998 | Cheung | 345/168 |
| 5,738,527 A | 4/1998 | Lundberg | 434/322 |
| 5,748,972 A | 5/1998 | Clark et al. | 713/323 |
| 5,751,663 A | 5/1998 | Johnson | 368/77 |
| 5,752,044 A | 5/1998 | Crump et al. | 713/323 |
| 5,758,174 A | 5/1998 | Crump et al. | 713/323 |
| 5,760,690 A | 6/1998 | French | 340/571 |
| 5,765,001 A | 6/1998 | Clark et al. | 359/196 |
| 5,768,602 A | 6/1998 | Dhuey | 713/322 |
| 5,794,058 A | 8/1998 | Resnick | 713/323 |
| 5,892,856 A * | 4/1999 | Cooper et al. | 382/291 |
| 5,926,404 A * | 7/1999 | Zeller et al. | 713/321 |
| 6,002,427 A * | 12/1999 | Kipust | 348/156 |
| 6,108,028 A * | 8/2000 | Skarbo et al. | 348/14.03 |
| 6,189,105 B1 * | 2/2001 | Lopes | 713/202 |
| 6,282,655 B1 * | 8/2001 | Given | 340/540 |
| 6,330,676 B1 * | 12/2001 | Kelsey | 713/2 |

\* cited by examiner

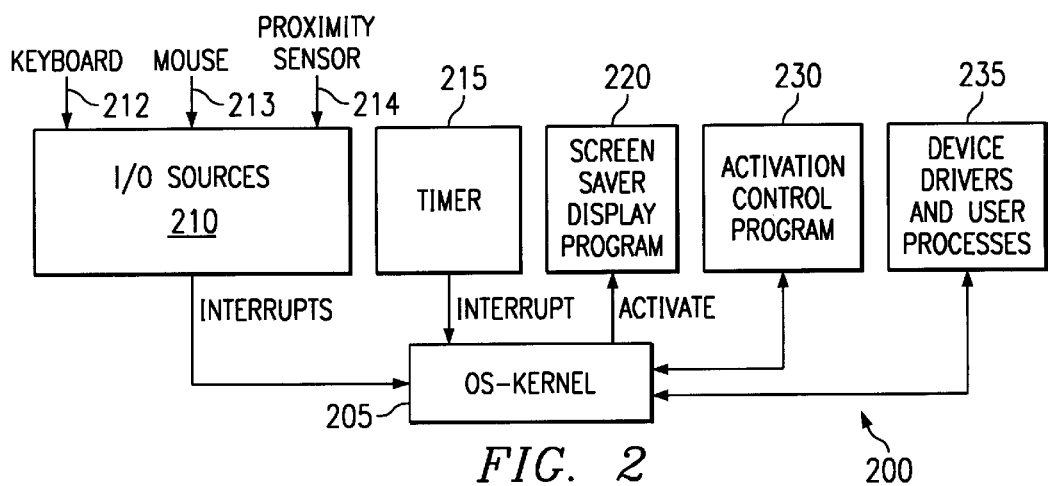
FIG. 2
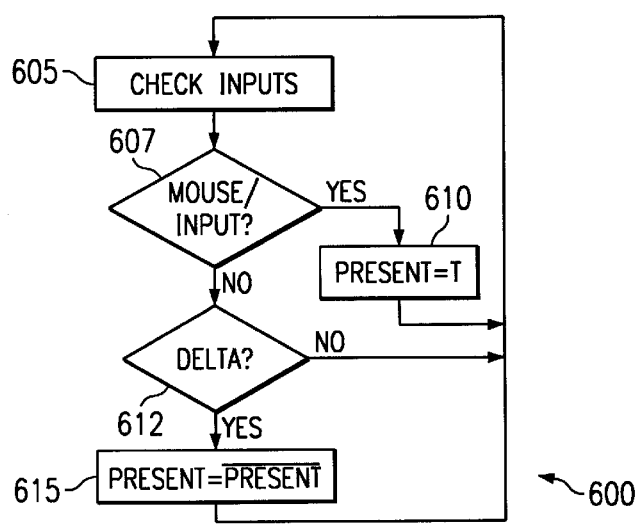
FIG. 3
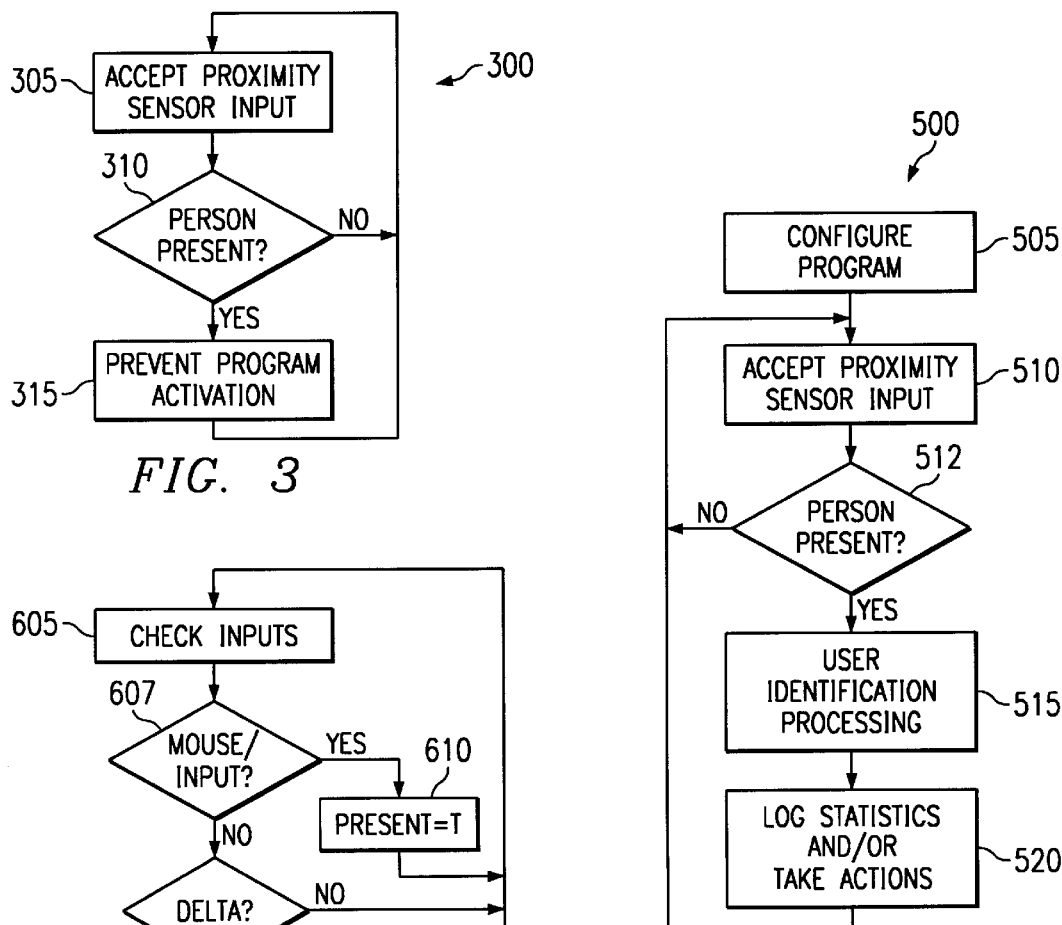
FIG. 5
FIG. 6

PROXIMITY SENSOR FOR SCREEN SAVER AND PASSWORD DELAY

BACKGROUND OF THE INVENTION

1. Field of the Invention

This invention relates generally to computer systems. More particularly, the invention relates to a proximity sensor based control system used to prevent a computer program such as a screen saver and/or a password protection program from being activated while an operator remains present in the vicinity of a computer.

2. Description of the Related Art

Screen savers are well known in the art of computer systems. Desktop computers such as personal computers and workstations use screen savers to display an image or animation after a period of user inactivity. Likewise, laptop computers and some personal digital assistants (PDAs) also employ screen saver technology. Screen savers are employed to prevent long-term damage which would otherwise be experienced by a computer display monitor if a single pattern such as a menu interface to an operating system were constantly displayed. Computer programs designed for use in office environments commonly display a password dialog box as a part of the screen saver image or as a stand-alone function. Password protection advantageously safeguards sensitive information held within a computer system during intermediate periods of time when the user has left the work area. Password protection with user inactivity activation allows the worker to leave the work area without needing to log out of a session with the computer. This increases security, because the user will often neglect to log out of the computer when leaving the work area to attend a meeting, eat lunch or perform other tasks away from the work area. On the other hand, the user may desire to log out of the computer session at the end of the workday.

Screen savers and password protection programs are typically activated by sensing a period of user inactivity. For example, such programs may be activated after a period of time has elapsed as measured from the last time the user has provided input to the computer using a keyboard and/or a mouse. One common method of controlling computer program activation is to use a timer. The timer is reset when an input is detected from the keyboard or the mouse. The timer is essentially a counter which counts for a predetermined number of clock cycles. After the timer has reached a predetermined count, the timer is said to "time-out." Typically, the timer generates a "time-out signal" upon time-out. The amount of time required for the timer to produce the time-out signal is called a "time-out period." Often the time-out signal is coupled to provide an interrupt to a central processing unit within the computer. When the time-out signal is detected, an interrupt request signal is provided to the central processing unit which in turn activates the screen saver and/or password protection program. Once the timer begins counting, if the user provides another input via the keyboard or the mouse, the timer is reset and begins counting anew. Thus the screen saver and/or password protection program will not be activated when the user is actively working with the computer. The screen saver and/or password protection program will only be activated after the user has remained inactive for the duration of the prespecified time-out period. The same holds true for other user activity controlled programs such as password protection programs and on-line connection programs. An on-line connection program is a program which initiates and/or deactivates a communication connection. For example, when a user has not sent any input to an on-line connection port for the duration of a time-out period, the on-line connection program will deactivate the connection so as to free up the connection port.

User activity controlled program technology as currently implemented in the art has some attendant problems. Users often become annoyed at the side effects inherent in the existing technology. For example, in the case of screen savers, while the user is actively working within his or her work area, several interruptions may occur which divert the user's attention from the computer's keyboard or mouse. In some instances the user may be involved with paperwork, a telephone call or a face-to-face interaction with a customer or colleague. In all such cases, time-out period may elapse and cause the screen saver to be activated. When the user returns to the computer desiring to interact with the operating system's user interface, the user is instead faced with a screen saver. In cases where the user needs to reenter a password, this is more than a mild annoyance. The password feature is useful in protecting the user's sensitive data when the user has left the work area for an extended period, but is more of a nuisance when the user has merely turned away to attend to another task such as a telephone call.

Hence there is a need for a user activity controlled program technology which can control the activation of a computer program without the aforementioned problems. For example, it would be desirable to have a screen saver which could provide a screen saving functionality without being activated while a user remains within the work area. It would be desirable for the computer to detect the physical presence of the user, and to use this detection to prevent a screen saver from activating. It would be desirable to include new timer algorithms adapted for use with this detection. Moreover, it would also be beneficial to provide intelligent screen saver activation control without the need to modify existing computers, screen saver software, or operating systems. It would also be desirable to integrate such a screen saver into computer hardware and software in order to provide efficient and ergonomic implementations. Systems and techniques are also needed to provide for low cost solutions as well as systems with extended functionality. Moreover, it would be desirable to have a user activity controlled program technology which could be used to activate various types of programs other than screen saver programs. Such a technology could be used, for example, to control the activation of password protection programs and online connection control programs.

SUMMARY OF THE INVENTION

The present invention solves these and other problems by providing methods and apparatus which detect the physical presence of a user and use this detection to control the activation of a user activity controlled program such as a screen saver or a password program. In a first aspect, the present invention involves an interface system which can be coupled to a computer. This system is operative to detect the physical presence of a user via a proximity sensor and to transmit a signal indicative of the presence of the user to prevent a computer program from being activated. The proximity sensor is operatively coupled to this interface system. The interface system includes a control module such as a microcontroller which causes information to be transmitted based on an output signal provided by the proximity sensor to prevent the activation of the computer program. The transmitted information is preferably embodied as a signal containing at least one bit of information designated by a logic-one voltage level, a logic-zero voltage level, or a transition therebetween. A typical value for logic-one is five volts and a typical value for logic-zero is zero volts. Typically, the transmitted information includes a sequence of bit values to form a coded command signal indicative of a mouse movement or a keyboard stroke. In one embodiment, this apparatus is supplied as an interface system which may be interposed between a computer port such as a mouse port and an input device such as a mouse. The present invention may be used to control various types of computer programs such as screen saver programs and/or password programs.

In a second aspect of the present invention, a timer is included in the interface system. When a timer is used, the interface system is operative to monitor a signal supplied by a user input-output device and monitor a signal supplied by a proximity sensor. The proximity sensor provides a signal indicative of the physical presence of a user. The system allows a computer program to be placed in a foreground state after a prespecified time duration has passed since both the user-input signal and the proximity-sensor signal have been inactive.

A third aspect of the present invention involves methods of deactivating a computer program. In a first step, the physical presence of a user is detected via a first proximity sensor. In a second step, the user is identified using at least one other proximity sensor. In a third step, a control signal is generated indicating to deactivate the computer program when the user has been identified as an authorized user. In one embodiment, the computer is a screen saver program with password protection, and in another embodiment the computer program is a stand-alone password protection program.

A fourth aspect of the present invention involves a software system for use on computers and related computerized equipment. The software system involves a background-processing module coupled to receive inputs from a user input-output device and a proximity sensor. The software system also includes a foreground-processing module which is activated in response to a control signal generated by the background-processing-module. The background-processing module maintains a timer indicative of the amount of time since a user has last applied an input via the user input-output device. The background module also accepts an input from the proximity sensor and causes the foreground-processing module to be activated. The foreground process is activated when both the timer indicates no user input has been received via the user input-output device for a prescribed amount of time and the proximity sensor indicates no user is present.

BRIEF DESCRIPTION OF THE FIGURES

The various novel features of the invention are illustrated in the figures listed below and described in the detailed description which follows.

FIG. 2 is a block diagram representing a software architecture of an operating system designed to provide a proximity sensor-based input-output operations.

FIG. 3 is a flow chart illustrating a method of processing employed to provide a proximity sensor based computer program.

FIG. 5 is a flow chart illustrating a method of processing employed to provide enhanced services and security based on the use of a proximity sensor.

FIG. 6 is a flow chart illustrating a method of sensor signal processing used to allow a low cost proximity sensor to be used to implement a reliable overall system.

DETAILED DESCRIPTION OF THE PREFERRED EMBODIMENT

In the detailed description of the preferred embodiment of the present invention which follows, specific embodiments are presented for purposes of illustration and description. While the present invention may be applied to control the activation of various types of computer programs, specific embodiments involving screen saver programs are provided herein merely by way of example. Timer controlled programs such as screen savers, password protection programs and on-line connection programs fall under the broader category of "user activity controlled programs." For example, in embodiments disclosed herein, the "screen saver" program may be substituted by or augmented with any user activity controlled program such as a password protection program or an on-line connection program. Many modifications and variations of the present invention will be apparent to those of ordinary skill in the art. Therefore, it is to be understood that the present invention encompasses all such equivalent embodiments.

Figure 1:
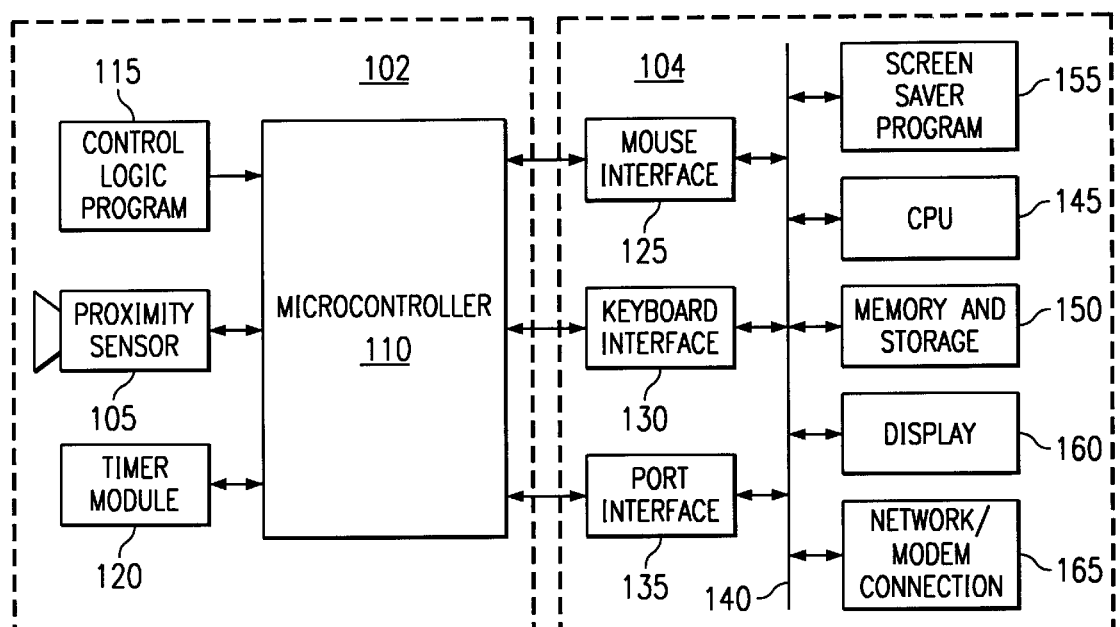
FIG. 1 is a block diagram representing a computer system equipped with a proximity sensor and related control and interface apparatus.

FIG. 1 is a block diagram representing an embodiment of computer system 100 equipped with a proximity sensor and related control and interface apparatus. The computer system 100 includes a standard computer 104 which may be designed in accordance with the prior art. The standard computer 104 may be any workstation, personal computer, laptop computer, personal digital assistant, or other computerized apparatus which does not include or is not coupled to the proximity-sensor interface system 102. Once the proximity-sensor interface system 102 is interfaced to the standard computer 104, the computer system 100 results.

The proximity-sensor interface system 102 includes a proximity sensor 105 operatively coupled to a microcontroller 110. The proximity sensor 105 may be any device which indicates the physical presence of a user. The microcontroller 110 is controllably coupled to a control logic program 115. The combination of the microcontroller 110 and the control logic program 115 constitutes a control module. As will be discussed, the control module may be implemented using hard-coded logic and other equivalent structures. The microcontroller 110 is also coupled to a timer module 120. In most embodiments the timer module 120 is implemented using hardware and software structures available within the microcontroller 110 itself. The microcontroller is also coupled to the standard computer 104. In the illustrative embodiment, three interface structures are shown. The microcontroller is coupled to a computer mouse interface module 125, a keyboard interface module 130, and/or a port interface module 135. In a given embodiment, one or more of these interface modules may be implemented. The interface modules 125, 130 and 135 are preferably coupled to a user-input device. A user-input device is any device such as a mouse, a keyboard, a joystick, or a microphone which accepts inputs in response to actions of a user. The user-input device is typically designed to connect to an associated computer-input port such as a mouse port, a keyboard port, a joystick port, a microphone port, an infrared port, or a wireless interface.

The proximity sensor 105 may be implemented using various component technologies. For example, the proximity sensor 105 may be implemented using a passive infra-red sensor, a diffuse reflectance sensor, a reflectance sensor, a light beam continuity sensor, a capacitance sensor, a radio frequency (RF) sensor, an audio sensor, an ultrasonic sensor, a pressure sensitive mat, or a weight sensor within a chair. Any sensor which can detect the physical presence of a user is within the scope of the present invention.

In various systems any of these sensors may be used in combination. A sensor made up of more than one sensor is known as a multidimensional sensor since it provides a multidimensional vector of data. A multidimensional sensor made up of two or more proximity sensors is called a "multidimensional proximity sensor." For example, a multidimensional sensor may be constructed using a combination of a reflectance sensor and a RF sensor. As will be discussed in connection with FIG. 5, the reflectance sensor allows any individual to be detected and the RF sensor allows the individual to be identified. Another example of a multidimensional sensor is a charge-coupled device (CCD) image sensor as used in a video camera. As video conferencing protocols such as the H.323 protocol from the International Telecommunications Union (ITU) become increasingly prevalent, more and more computers such as the standard computer 104 will include a CCD camera. In such cases, the existing CCD camera may be used as the proximity sensor 105 if the control logic program 115 is also employed. In a system using the existing CCD camera as the proximity sensor 105, an image processing software program would cooperate with the control logic program 115 to recognize the presence and possibly the identity of the user. The proximity sensor 105 may also be implemented with similar technologies such as a microphone coupled to a voice recognition software program. A microphone can be used to collect a vector of speech samples and thus behaves like a multidimensional sensor. Voice recognition software analyzes a user's voice input and compares this input to a "voice print" to identify the user. Because most multimedia PCs already include microphones, solutions augmented with microphone based processing can be provided without the need for additional hardware. The embodiments making use of multidimensional sensors and signal processing techniques are discussed in connection with FIG. 5.

Figure 1A:
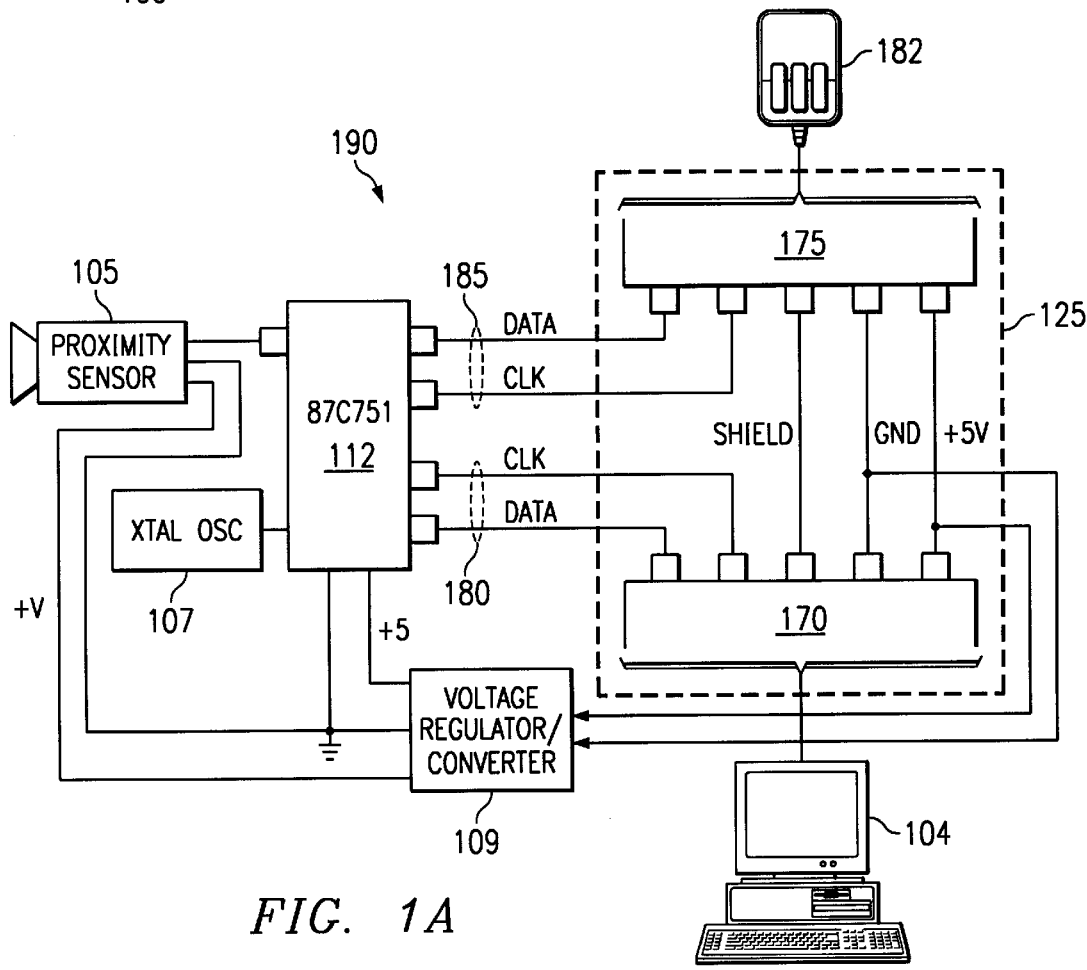
FIG. 1A is a block diagram illustrating an embodiment of a proximity sensor interface which can be connected to a standard computer mouse port.

The proximity sensor 105 may be physically mounted within the computer system 100 in various ways. In one embodiment, the proximity-sensor interface system 102 is built within its own enclosure as a stand-alone unit. Such an embodiment is illustrated in FIG. 1A where the present invention is embodied as a stand-alone device which connects between the mouse 182 and the computer system 104. Other embodiments involve building the proximity-sensor interface system 102 into a keyboard or a mouse. The computer system 104 as illustrated in FIG. 1A includes a keyboard, a monitor and a mouse 182. Still other embodiments involve building the proximity-sensor interface system 102 into the enclosure used to house a motherboard of the computer. This enclosure is commonly called a "CPU box" or equivalently, a "CPU tower." In FIG. 1A, the "CPU box" is shown as being located between the keyboard and the monitor in the computer system 104. Other embodiments may be constructed where the proximity-sensor interface system 102 is built into a computer display monitor, a mouse or a trackball, or some other add-on accessory device. The present invention comprehends all of these variations as well as other equivalent variations which may be deemed desirable as new accessories and peripherals are added to computer systems.

Various configurations may be employed to provide power to the proximity-sensor interface system 102. Often the proximity sensor 105 will require one or more direct current (DC) voltage levels other than the ones readily available. In such cases a DC-to-DC converter may be used to transform an available voltage such as +5 volts to some other needed voltage. Other known methods are also available to derive a given voltage level from an alternating current (AC) power source.

The proximity-sensor interface system 102 controls a flow of information between the proximity sensor 105 and the standard computer 104. In the illustrative embodiment of FIG. 1, the flow of information is controlled using the combination of the microcontroller 110 and the control program logic 115. In the illustrative embodiment, the control program logic 115 is implemented as a software program held within a memory module (not shown). In some embodiments, the control program logic 115 may reside in an internal memory located within the microcontroller 110. The control program logic 115 may also reside in a static memory such as a read only memory (ROM) or an electrically erasable read only memory (EEPROM). In embodiments involving an EEPROM, the control program logic 115 may be optionally downloaded via one of the interface modules 125, 130 and/or 135 to allow modifications to be made. In still other embodiments, the control program logic 115 may be downloaded across one of the interface modules 125, 130, or 135 into a volatile memory such as an SRAM chip. The microcontroller 110 may be implemented using an 87C751 from Phillips Semiconductor Inc. Other microcontrollers, such as the PIC series of microcontrollers available from Microchip, Inc., may also be used to control the flow of information between the proximity sensor 105 and the standard computer 104. This flow of information may similarly be controlled using any available microprocessor or microcontroller.

The control module made up of the combination of the microcontroller 110 and the control logic program 115 may be alternatively implemented using one or more customized logic devices. For example a programmable logic array, a gate array or an application specific integrated circuit (ASIC) may be designed using a hard-coded state machine to control information flow and perform related logic processing. Most hard-coded logic based solutions do not require a separate memory to hold the control program logic 115 since that logic is hard-coded. The hard-coded logic based solution represents an engineering trade-off between design expenses and production expenses. When the production volume warrants, it often becomes economical to pursue the hard-coded logic based solution. In this case, the microcontroller 110 and the control program logic 115 are implemented using the hard-coded logic device. It should also be noted that some hard-coded logic devices are also reprogrammable. For example, the control program logic 115 may be downloaded via the interface module 125, 130 or 135 into a set of volatile logic-configuration-memory cells located on a gate array as provided by Xilinx Corp. Such solutions have the advantage of being easily modified and upgraded.

The timer module 120 is preferably implemented in both hard-coded designs and microcontroller based designs using an internal programmable timer module. An internal timer includes a register to hold a count value, a counter state machine, and a coupling to a clock input. Such timer modules are well known and are available with most microcontrollers. For example, the 87C751 microcontroller from Phillips Semiconductor Inc. has an internal programmable timer module. This timer module is documented in the 87C751 microcontroller user's guide available from Phillips Semiconductor Inc.

Depending on the embodiment, one or all of the interface modules 125, 130 and 135 may be implemented. In an exemplary embodiment, the present invention is implemented using only the mouse interface module 125. This embodiment is discussed in detail in connection with FIG. 1A. Other embodiments use only the keyboard interface module 130. Various types of embodiments may be constructed using the port interface module 135. The port interface module may be implemented using a serial port such as an RS232 port, a parallel port such as a printer port, an infrared port, a wireless interface, or some specialized port such as microcontroller port interface. Similarly, a universal serial bus interface (USB) as is used to interconnect various types of computer peripherals may also be used. The port interface module 135 comprehends any custom or standardized port interface which may be used to route signals generated by the proximity-sensor interface system 102 into the standard computer 104.

Referring again to FIG. 1, a set of component subsystems within the standard computer 104 are illustrated as being interconnected via a bus structure 140. For example, the computer mouse interface module 125, the keyboard interface module 130, and the port interface module 135 are all internally coupled to the bus 140. Also coupled to the bus 140 are a central processing unit (CPU) 145, a memory and storage device 150, a screen saver program 155, a display monitor 160, and an optional modem or network connection 165. The screen saver program 155 preferably includes a screen saver activation control program and a screen saver display program. The screen saver activation control program monitors user inputs and activates the screen saver display program after a period of user inactivity has been detected. A mouse is generally connected to the mouse interface module 125 and a keyboard is generally connected to the keyboard interface module 130.

In alternative embodiments, the screen saver program 155 may be any user activity controlled computer program. Also, more than one such program may be employed in a single system. For example, the screen saver program 155 of the computer system 104 may involve both a conventional screen saver program and a separate password protection program. In other embodiments, the screen saver program 155 may include a password protection feature. The discussion herein will focus on the illustrative embodiment as depicted in FIG. 1.

The bus 140 may be constructed as a set of unbroken wires or one or more optical fibers used to carry signals between the component subsystems within the standard computer 104. In some embodiments of the present invention, the bus 140 may be implemented equivalently using a set of direct parallel and/or serial connections between individual modules. The bus 140 as illustrated in FIG. 1 shows a low cost means to connect the illustrated subsystems. A combination of bus connections and direct serial or parallel links may be used to implement a subset of the connection structure provided by the bus 140. Different implementations represent different price-to-performance ratios and will be dictated by the needs of an individual embodiment. The bus 140 also comprehends multi-layered bus structures. For example, some embodiments make use of a local processor bus connected to the CPU 145 and the memory and storage device 150. A peripheral interconnect bus such as a PCI bus is then used to interconnect the other subsystems. In multi-layered bus based designs, the different layers are preferably interconnected by bus bridges. All of these and other equivalent embodiments of the bus 140 are known to the skilled artisan and are considered to be equivalents of the bus 140. From here forward, the discussion will center on the illustrated embodiment of the standard computer 104 whereby all subsystems are directly connected via the bus 140. Embodiments where the bus 140 represents a different physical interconnection topology are implicitly included in the discussion below.

In operation, the standard computer 104 operates a screen saver program 155. For example, whenever the user moves or clicks the mouse, information indicative of these actions are transmitted via the mouse interface module 125 to the CPU 145. In general, the user provides an input via a user input-output device and the user input-output device transmits the information in the form of a coded-command signal made up of a sequence of voltage-levels representative of bits of the information. Typically, interrupts are generated to inform the CPU 145 when the user's input has been provided. Likewise, whenever the user applies a keystroke to the keyboard, data indicative of this activity is transmitted to the CPU 145 via the keyboard interface module 130. The screen saver program 155 is typically resident in the memory and storage unit 150 and functions as a memory resident background process within the software structure of the computer system 100. A timer is maintained and is updated in accordance with a timer-based interrupt. The timer is restarted with an initial count when a keyboard or mouse stroke is detected. If no keyboard or mouse input is detected for the duration of a prespecified time-out period the screen saver is moved from a background state into a foreground state. When the screen saver functions in the foreground state, it displays a static or animated pattern on the display monitor 160. The portion of the screen saver which functions in the foreground state is also called a "screen saver display program." The portion of the screen saver program with operates in the background state is also called a "screen saver activation control program." The screen saver activation control program monitors user inputs and places the screen saver program into the foreground state after a period of user inactivity has been detected. Typically, even when the screen saver display program has been placed into the foreground state, the screen saver activation control program continues to run in the background. When a user input or physical presence is once again detected the screen saver activation control program eventually places the screen saver display program back into a background state. When the screen saver display program is in the background state it is substantially inactive.

In embodiments of the present invention involving other types of programs beside screen saver programs, the "screen saver display program" may be replaced by a more generic "operational program." For example, the activation control program 230 may control the activation of a "password protected access program." In this case, the "operational program" is the "password protected access control program." The "password protected access control program" is a program which restricts access to one or more computer programs unless a password is properly entered. Similarly, the screen saver display program may itself include a password protected access control program.

In the above discussion, the notions of a "background state" and a "foreground state" have been used. A "background-processing module" is a computer program which runs in the background state and is allowed to run concurrently with another program. Usually, the operation of a background process is transparent to the user. A "foreground-processing module" is a computer program which runs in the foreground state and whose operation is evident to the user. A foreground-processing module is typically operative to present a user interface to the user. As discussed above, the screen saver program 155 includes both a background-processing module and a foreground-processing module and can thereby operate in both the background state and the foreground state. While the user is actively using the standard computer 104, the screen saver program 155 does not actively display a screen saver image on the display 160. Rather, it quietly monitors the keyboard and the mouse interface activity. A counter is allowed to run and is reset every time a user input is detected. When no user inputs have been detected for a long enough time to allow the counter's time-out value to be reached, the screen saver program 155 moves into the foreground and makes its presence known by displaying the screen saver image or animation. When the screen saver moves from the background to the foreground, it is said to have been "activated." When the screen saver moves from the foreground to the background, it is said to have been "deactivated."

In accordance with the present invention, the proximity-sensor interface system 102 augments the aforementioned operation by preventing the screen saver program 155 from being activated while the user remains in the vicinity of the computer system 100. When the proximity sensor 105 detects a user to be present, the control logic program 115 instructs the microcontroller 110 to emulate user activity by applying a data sequence to one of the interface modules 125, 130, or 135. For example, in some systems the microcontroller 110 interfaces to the standard computer 104 via the mouse interface module 125. When the proximity sensor 10 detects the user to be present, the microcontroller 110 signals the user's presence by supplying a mouse-data signal indicating to move the cursor one or more pixels in the upward direction. A short time later, the microcontroller sends a mouse-data signal indicating to move the cursor back downward to the original position. The screen saver's counter is thus prevented from reaching its time-out value and the screen saver is prevented from activating. This added functionality is advantageously added without the need to alter the screen saver software 155 or the standard computer 104.

In some systems, a mouse data emulation of one pixel movement is sufficient to prevent the user activity control from timing out. In other systems, depending on the screen saver activation software, an emulation of a movement of more than one pixel is required. In still other screen savers, a one pixel movement will delay the screen saver activation, but is insufficient to "wake up" the computer from a screen saver foreground state. In yet other systems, a keyboard command such as a "control" keystroke or a "function" keystroke must be emulated. The microcontroller 110 may be programmed by skilled artisans to emulate the appropriate signals needed to control the activation of screen savers and other user activity controlled programs. For example, the microcontroller 110 may be preprogrammed during manufacture to generate the proper signals to control a screen saver program. Alternatively, the microcontroller 110 may be programmed to enter a "training mode." In one embodiment of a training mode, a message is displayed asking the user to strike one or more keys to achieve a specified effect such as deactivating a screen saver. When the user strikes the one or more keys, the microcontroller 110 records associated keystroke information and subsequently uses this information to emulate user activity. Alternatively, the user may activate a switch to enter the training mode. More details regarding the operation of specific embodiments of the proximity-sensor interface system 102 are provided in connection with FIGS. 1A to 5.

While it is advantageous to be able to add the proximity-sensor interface system 102 to the standard computer 104 without the need to alter the design of the hardware or software of the standard computer 104, in some cases it may be advantageous to do so. For example, when the present invention is provided as a standard feature of a computer, it is advantageous to alter the hardware and/or software of the standard computer itself. In this case instead of supplying the standard computer 104 and augmenting it with the proximity-sensor interface system 102, the computer system 100 is manufactured and supplied as an integrated system. In such a system the screen saver activation logic which runs in the background is preferably implemented using the methods of the present invention. In this situation the proximity-sensor interface system 102 preferably makes use of the port interface module 135, the bus 140 or other internal interface. The proximity sensor then provides input to the interrupt structure of the operating system just like the keyboard and mouse. The background-processing module within the screen saver program 155 then updates a set of variables needed to determine when to activate the screen saver program 155. The set of variables is included in a data area which is preferably co-located along with the screen saver program 155. The logic used to control screen saver activation in such an embodiment is described in connection with FIG. 4. Such a modified screen saver program can be built into an operating system as discussed in connection with FIG. 2. Before discussing these embodiments, an embodiment of the proximity-sensor interface system 102 which plugs into an existing mouse connector of the standard computer 104 is described.

Referring now to FIG. 1A, a detailed schematic of a specific embodiment 190 of the proximity-sensor interface system 102 is illustrated. In this embodiment, only the mouse interface module 125 is used, and the microcontroller 110, the control program logic 115 and the timer module 120 are all implemented using an 87C751 microcontroller 112. The microcontroller 112 is coupled to receive an input from the proximity sensor 105. An oscillator circuit 107 is also provided and is coupled to generate a clock signal for the microcontroller 112. In this embodiment, the oscillator 107 is made up of a crystal and two capacitors which are coupled in a feedback arrangement to an amplifier located within the microcontroller 112. This combination produces a square wave oscillator which provides a clock signal to the microcontroller 112. In the illustrative embodiment, the mouse interface module 125 is designed using the PS/2® mouse interface protocol. An MTA41110 mouse and trackball controller IC from Microchip Inc. may be used to control this interface. The MTA41110 data sheet provides a detailed description of such an interface together with background information useful for implementing the mouse interface module 125 of the present invention. A first connector 170 is designed according to the PS/2® mouse protocol and is connectable to a mouse-port as provided by the standard computer 104. A second connector 175 is also designed according to the PS/2® mouse protocol and is connectable to a PS/2® compatible mouse device 182. The mouse interface module 125 is thus designed to connect between the standard computer 104 and the mouse device 182.

The internal wiring employed within the embodiment 190 to interface the first connector 170 to the second connector 175 is illustrated in FIG. 1A. A +5 v power wire, a ground wire, and a cable shielding wire are connected straight across the interface. The +5 volt and the ground wires are tapped off and routed to a voltage regulator 109. The voltage regulator 109 supplies a regulated +5 volt power lead and a ground lead to the microcontroller 112 as well as any other devices needing power. In some systems the proximity sensor 105 requires DC voltage levels beside the ones shown, in which case a DC-to-DC converter may be advantageously used.

The data and clock wires do not pass straight across the interface but are rather routed to a set of input-output port pins of the 87C751 microcontroller 112. A first pair 180 of data and clock wires are connected between first connector 170 and a first pair of input-output port pins of the microcontroller 112. A second pair 185 of data and clock wires are connected between the second connector 175 and a second pair of input-output port pins of the microcontroller 112. The proximity sensor 105 is also coupled to provide a digital logic input to another port pin of the microcontroller 112. The wires carrying the data and/or the clock signals carry the "mouse-data signal" used to indicate a mouse movement. Note that a keyboard interface is very similar to a mouse interface, and embodiment 190 may be modified for the case where the data and clock wires carry keyboard-data signals indicative of keystroke activity.

In operation, the microcontroller 112 receives a set of data and clock signals from the mouse device 182 on the second pair 185 of data and clock wires. The microcontroller then echoes these received signals by transmitting them back to the standard computer 104 via the first pair 180 of data and clock wires. For example, when a user moves the mouse device 182 the data and clock wires 185 become active by carrying signal information which the microcontroller 112 will detect on its input-output port pins. The microcontroller 112 is operative to read the received data values into an internal register. Also, the microcontroller 112 echoes the data and clock signals back out the second data and clock wires 180. This way, the standard computer 104 receives inputs sent out by the mouse device 182. Since the microcontroller 112 passes the data signals generated by the mouse device 182 back to the standard computer 104, the microcontroller 112 is able to monitor mouse activity. Since the microcontroller 112 is able to drive the first pair 180 of data and clock wires, it is also able to generate its own data patterns and deliver them to the standard computer 104 via the first pair 180.

As discussed in connection with FIG. 4, the microcontroller 112 is operative to monitor data traveling from the second pair 185 of data and clock wires 185 back to the first pair 180 of data and clock wires. When a period of inactivity is detected, and the proximity sensor detects the physical presence of the user, the microcontroller 112 is operative to insert its own data sequence and deliver it via the first pair 180 of data and lock wires back to the standard computer 104. The data signal sent back to the standard computer 104 typically signals a mouse movement of one or more pixels in the up and/or down direction. Other movement directions such as a left and/or right may also be signaled. When this data signal is received, the screen saver background-processing module within the screen saver program 155 resets its counter as though the user had moved the mouse device 182. In essence, the screen saver background-processing module is fooled into believing the user had moved the mouse when in fact the user was detected as being in the vicinity of the computer by the proximity sensor 105, but no mouse movement was actually made. This allows the user to tend to other tasks such as the telephone without the screen saver being activated. In some embodiments the screen saver program 155 may include a password protection feature, and in other embodiments the screen saver program 155 may be substituted or augmented with other user activity controlled programs. More discussion relating to aspects of the operation of the proximity-sensor interface system 102 and the embodiment 190 are discussed in connection with FIG. 3–6.

Referring now to FIG. 2, a software architecture 200 is illustrated which can be used to control the hardware of the computer system 100. The software architecture 200 is applicable to systems designed to accept inputs from the proximity-sensor interface system 102 via the port interface module 135. This input is supplied to the software architecture via an input 214. The software architecture 200 is most applicable for computers where the proximity-sensor interface system 102 is integrated into the system at the time it is manufactured as opposed to standard computers to which the proximity sensor system 102 has been added at a later time. The software architecture 200 may be supplied on a recordable medium readable by a computer system. An example of the recordable medium is a CD-ROM. The CD-ROM is inserted into a CD-ROM disc-drive, and the software with the software architecture 200 is loaded into volatile and/or non-volatile memory in the storage unit 150 of the computer system 100. When the computer system 100 is shipped with software loaded, the software with the software architecture 200 may be already loaded into the memory and storage unit 150.

At the center of the software architecture 200 is an operating system kernel 205. Operating system kernels are well known in the art and control the access of software processes to the CPU 145. A software process can be defined as a flow of instructions executed on the CPU 145. As is common practice, the kernel 205 maintains a data structure called a task control block for each process. The kernel accepts interrupt inputs from a set of input-output sources 210 and a timer 215. In the embodiment shown, the set of input-output sources 210 includes a keyboard 212 a mouse 213 and a proximity sensor input 214. The kernel 205 controls the execution of multiple programs on the CPU 145 by activating and deactivating processes in response to the interrupt inputs produced by the set of input-output sources 210 and the timer 215. An example of a process which is activated and deactivated as a function of interrupts is a screen saver display program 220. The activation and deactivation of a set of processes 235 corresponding to device drivers and user programs are also controlled using inputs based on the interrupts supplied by the set of input-output sources 210 and the timer 215. For example, in many operating systems, when a user moves a cursor into a window using a mouse, the program represented by the window is activated. An example of an available operating system kernel is the Unix® kernel originally developed by Bell Laboratories of AT&T, now Lucent Technologies, Inc. Other examples of operating system kernels are the kernels within the Windows98® and WindowsNT® operating systems provided by Microsoft Inc. Hence the software architecture 200 is preferably implemented as a computer operating system such as one which is shipped with the computer system 100.

The software architecture 200 is operative to control the activation of the screen saver display program 220 by taking into account input provided by the proximity-sensor interface system 102 as supplied by the port interface module 135. That is, a set of methods as discussed in connection with FIG. 3–5 may be practiced by an activation control program 230 which is a background-processing module and controls the activation of the screen saver display program 220. In the software architecture 200, an activation control program 230 is operative to analyze inputs from multiple sources to determine when to place the screen saver display program 220 into an activated foreground state whereby it displays a screen saver. That is, the software architecture 200 involves an operating system and an activation control program 230 which processes information provided via the port interface module 135. The activation control program 230 preferably analyzes the keyboard input 212, the mouse input 213 and the proximity sensor input 214 in determining when to activate the screen saver display program 220.

As discussed in connection with FIG. 5, other user activity controlled programs beside the screen saver display program 220 may be similarly activated by a program with the structure of the activation control program 230. For example a usage statistics monitoring system may be implemented to keep statistics relating to a worker's presence in the work area, and a security system may be implemented to detect and report intruders during times where no use of the computer system 100 is authorized. These other uses are discussed in connection with FIG. 5. In other systems, the screen saver display program 220 may be substituted by or augmented with a password protection program. In general, the screen saver display program 220 may be replaced by any operational program whose activation is controlled by the activation control program 230.

FIG. 3 illustrates a method 300 used to control access to a computer program such as a screen saver. In a first step 305, an input is checked based on the output of the proximity sensor 105. Control passes out of the first step 305 based upon a decision 310. If the proximity sensor does not detect a person to be present, no action is taken and control loops back to the first step 305. If the proximity sensor does detect a person to be present, control passes to a second step 315. In the step 315, an action is taken to prevent a program such as a screen saver from being activated. As discussed in connection with FIG. 1A, different embodiments can be used to prevent the screen saver from being activated by manipulating data sequences passed across an interface such as the mouse interface 170. As discussed in connection with FIG. 2, a screen saver can be prevented from being activated by analyzing the proximity sensor inputs 214 in addition to the keyboard inputs 212 and the mouse inputs 213. The method 300 may similarly be applied to control the activation of other programs beside a screen saver.

Any program whose activation is normally governed by the detection of the absence of a keyboard or mouse input from a user may be modified in accordance with the method 300. An example is an Internet browser or other on-line connection program. If the user does not provide any input for a time, the on-line connection program will typically disconnect the user. This causes the user to need to reconnect. Reconnecting can often be a tedious and annoying task, especially when the on-line system becomes congested and denies the user access. The method 300 can be directly applied to this type of application by detecting when the user is present in the work area and causing data to be transmitted over a communication link indicative of a keystroke or other input. As discussed in connection with FIG. 4, a timer may be incorporated into the method 300 to allow the user to leave the work area for a specified amount of time while preventing an attached software system to time-out. For example, the user can set a variable to indicate the method 300 is to continue to prevent the on-line connection program from disconnecting for twenty minutes after the user has left the vicinity of the computer.

Figure 4:
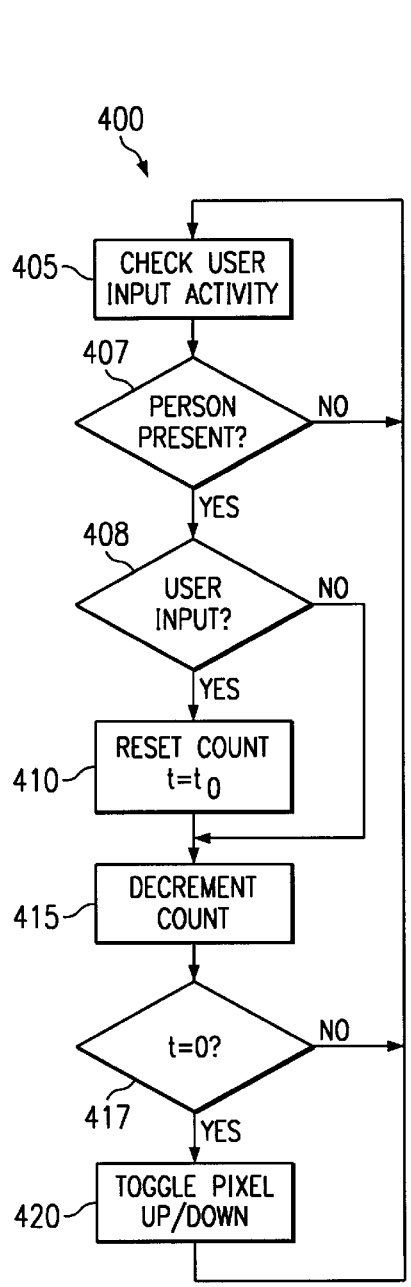
FIG. 4 is a flow chart illustrating a method of processing whereby a timer is employed to provide intelligent control of the activation or delay of a computer program.

FIG. 4 illustrates a method 400 which corresponds to a specific embodiment of the method 300. The method 400 is preferably implemented as a part of the control program logic 115. The method 400 preferably runs on the microcontroller 110 and exercises the timer module 120. The method 400 can also be implemented as a control program running on the microcontroller 112 in the specific embodiment 190. The method 400 is operative to provide additional control to a screen saver program running on the standard computer 104. The method 400 augments presently available screen saver activation logic with inputs provided by the proximity sensor 105. When the user is detected by the proximity sensor 105, the method 400 periodically transmits information to emulate a user input. In the embodiment 190, the transmitted information indicates small mouse movements, for example one or more pixel upward and/or downward periodically at a regular thirty-second interval. The interval is controlled by the timer module 120 which uses timer-data and a counting procedure to periodically supply a time-out pulse at a prespecified interval. The net effect is to keep the screen saver from being activated without distracting the user and without needing the hardware or the software of the standard computer 104 to be modified.

In a first step 405, a set of user inputs are sampled or otherwise recorded. The sampling of inputs represented by the first step 405 may be asynchronous. That is, the user inputs sampled in the first step 405 may be tied to interrupts and thus arrive outside of the control flow illustrated by the flowchart of the method 400. The method 400 is itself preferably tied to a timer interrupt. In a preferred embodiment, the step 405 represents the entry point to an interrupt service routine triggered by a time-out signal generated by the timer module 120. The timer module 120 is preferably configured to generate the time-out signal once every second. This way, the step 405 is executed once per second. Control passes from the first step 405 based on a first decision 407. The first decision 407 is operative to pass control back to the step 405 if the proximity sensor 105 detects the user not to be present in the vicinity of the computer 100. In the preferred embodiment, the timer module 120's interrupt introduces a one second delay into the control path from the first decision 407 back to the first step 405. When this control path is taken, no inputs are provided by the method 400 and the screen saver activation program is allowed to function in its normal mode.

If the proximity sensor 105 does detect the user to be present, control passes from the first step 405 based on a second decision 408. The second decision 408 evaluates to true if a user input has been detected. For example, in the embodiment 190, the second decision 408 evaluates to true if a mouse movement has been detected. In other embodiments, the second decision 408 is based upon inputs from one or more other sources such as a keyboard. When the second decision 408 is affirmative, control next passes to a third step 410. In the third step 410, a counter variable is reset. In the embodiment 190, this counter variable is included in a data area controlled by the method 400 and is preferably set to a value of thirty. Control next passes from the second step 410 to a third step 415. If no user input is detected in the decision 408, control passes directly from the first step 405 directly to the third step 415. In the third step 415, the counter variable is decremented. Note when user input is detected in the decision 408, the counter is reset in the step 410 so as to inhibit the counter from decrementing to zero when a user is actively supplying inputs to the computer system 100.

Control next passes from the third step 415 based on a third decision 417. In the third decision 417, the counter variable is compared to zero. If the timer variable has not decremented to zero, control passes from the third decision 417 back to the first step 405. In the preferred embodiment, this branch incurs a one-second delay because the reentry of control into the step 405 is controlled to coincide with the timer-out signal produced by the timer module 120. If the counter variable is detected as having counted down all the way to zero, control passes from the third step 415 to a fourth step 420. The fourth step 420 is operative to send a signal to simulate a user input. In the illustrative embodiment 190, the fourth step 420 is operative to send a simulated mouse command over the first pair 180 of data and clock wires to emulate a mouse movement. An internal state variable is also preferably toggled in the step 420 so the method 400 can keep track of whether to send a command to move the mouse upward and/or downward by one or more pixels. After the fourth step 420 has executed, control next passes back to the first step 405, again with a one-second delay.

The effect of the method 400 is to send mouse movement commands and to prevent the screen saver from activating when the user is detected as being present in the vicinity of the proximity sensor 105. In a preferred embodiment as described above, the method 400 sends a mouse-data command at a regular interval of 30 seconds to toggle the cursor position upward or downward by one or more pixels. In other preferred embodiments the cursor position may be toggled in other ways, such as, for example left and/or right by one or more pixels. When the user is actually providing user inputs, the counter variable is reset in the step 410 thereby inhibiting the transmission of additional user input signals in the step 420. Only when the user has not provided any input for thirty seconds will a mouse movement be emulated in the step 420.

While the method 400 is designed to operate with the screen saver activation program provided by the standard computer 104, the method 400 also may be applied within the activation control program 230. This alternate embodiment corresponds to the case where the computer system 100 is designed for use with the proximity-sensor interface system 102. Typically, such embodiments involve the port interface module 135, the bus 140, or other internal interface. The activation control program 230 accepts the inputs provided by the input-output sources 210. In an embodiment whereby the method 400 is implemented within the activation control program 230, the first decision 407 is deleted and the second decision 408 checks to see if any activity has been detected on the input-output sources 210. If the input-output sources 210 report any activity, then control passes from the first step 405 to the second step 410. If no inputs are detected, control passes from the first step 405 to the third step 415. This way the method 400 can be applied to screen savers and operating systems specially designed to accept control from the proximity-sensor input 214. Moreover, while the method 400 is illustrated as controlling a screen saver display program, the method 400 may also be used to control any user activity controlled program.

Figure 4A:
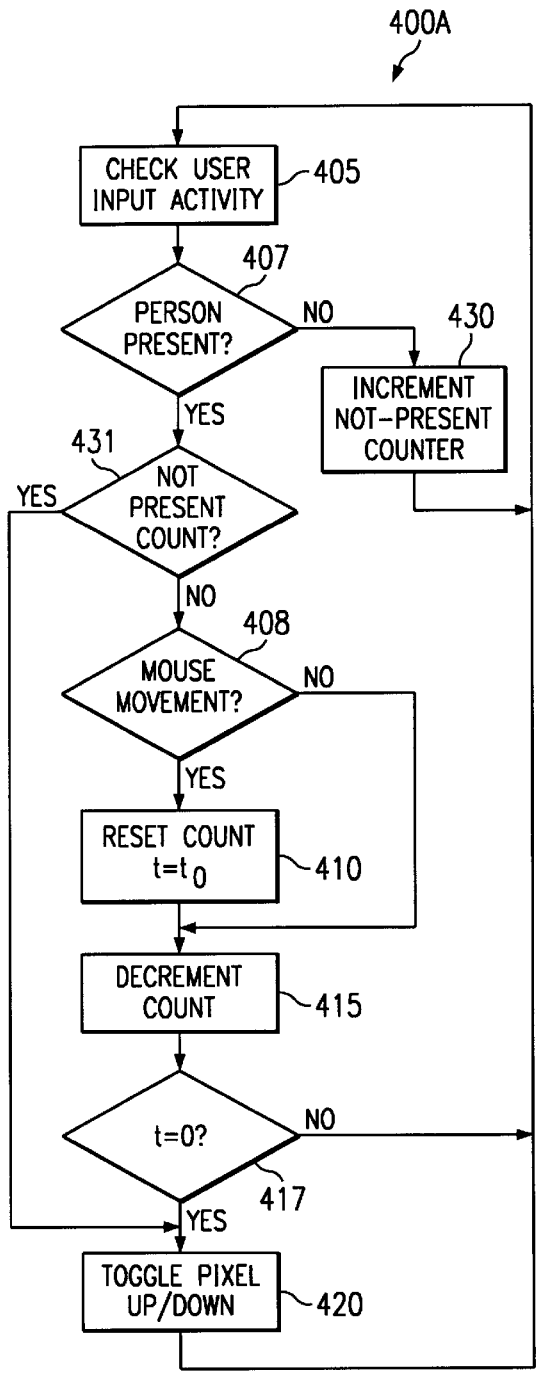
FIG. 4A is a flow chart illustrating a method of processing whereby a first timer is employed to provide intelligent control of the activation of a screen saver program, and a second timer is employed to deactivate a screen saver program.

A variation of the method 400, a method 400A is illustrated in FIG. 4A. The method 400A augments the method 400 with the ability to automatically deactivate a user activity controlled program such as the screen saver program 155 when the user returns to the computer system 100. For example, the user may immediately wish to check an email application for new messages. The method 400A is most applicable when the screen saver 155 does not require the user to enter a password. As discussed in connection with FIG. 5., the method 400A can be also be modified to operate when the screen saver program 155 involves a password.

The method 400A, begins with the first step 405. As with the method 400, this step is preferably entered once per second in coincidence with timer module 120's time-out signal. In the method 400A, control passes from the step 405 under the control of the decision 407. If the proximity sensor 105 does not detect the user to be present, the decision 407 regulates control to pass from the first step 405 to a fifth step 430. The fifth step 430 is operative to increment a not-present counter. The not-present counter is preferably implemented as a software variable accessible by the control logic program 115 which implements the method 400A. The not-present counter keeps track of the amount of time the user has been away from the computer 100. If the user is gone a long time, the not-present counter preferably saturates at a maximum value to keep the counter from wrapping around to zero. In some embodiments the maximum value of the not-present counter may be as low as one.

If the first decision 407 detects a user to be present, a fourth decision 431 checks the not-present counter value to a threshold. The threshold is a number greater than or equal to one which indicates an amount of time the user has been away from the computer system 100. If the not-present counter is greater than or equal to the threshold, then the decision 431 is operative to reset the not-present counter to zero and pass control from the step 405 directly to the step 420. In the step 420 a pixel value is toggled as discussed in connection with the method 400, thereby immediately deactivating the screen saver program. If the not-present counter is below the threshold, control is regulated by the decision 408 and the method 400A proceeds identically to the method 400 as discussed above.

The effect of the foregoing sequential logic is to provide the same functionality as the method 400, but to also deactivate the screen saver once the user has returned to the computer system 100. The threshold value is used to filter spurious events and may be set as low as one. Setting the threshold to one is equivalent to using a single-bit state variable to indicate the user was not present in a previous pass through the method 400A but is present in the current pass through the method. When the method 400A or an equivalent thereof causes an input to be sent to the screen saver program 155 (or the activation control program 230) substantially when the proximity sensor 105 detects a transition from the user not being present to the user being present.

Referring now to FIG. 5, a method 500 is illustrated for using the input provided by the proximity-sensor interface system 102 for additional modes of control. In a first step 505 a set of program variables are set up and initialized. Control next passes to a second step 510. All control paths into the second step 510 are preferably regulated to coincide with the time-out signal produced by the timer module 120. For example, the second step 510 entered in response to a time-out interrupt produced by the timer module 120. In the second step 510 inputs provided by the proximity sensor 105 are sampled. These inputs may be obtained by polling the proximity-sensor interface system 102, or by checking a memory location written under the control of an interrupt handler. If no input is reported by the proximity sensor 105, control loops back around to the second step 510 under the control of a decision 512. This looping of control preferably incurs a delay substantially equal to the time-out period of the timer module 120. If an input is reported by the proximity sensor 105, control passes to an optional third step 515. The optional third step 515 is operative to perform a user identification process as discussed below. Control next passes from the optional third step 515 to a fourth step 520. If an input is reported by the proximity sensor 105 and the optional third step 515 is not present, control passes directly from the second step 510 to the fourth step 520. The fourth step 520 is operative to log statistics or take other actions. Examples of statistics logged or actions taken in the step 520 are presented below.

In a specific embodiment of the method 500, the fourth step 520 is operative to act as a usage statistics monitoring program which maintains a log of user activity within the work area. In a working environment, a management entity may desire to measure worker productivity based on the amount of time a worker is physically present within the proximity of the computer system 100. In another specific embodiment of the method 500, the fourth step 520 may be set up to provide an intruder alarm. For example, the worker may set an alarm-variable indicating that no user is authorized to come in the work area for a specified amount of time. Alternatively, the alarm-variable may be set based on a timer to indicate when no user is authorized to be in the work area, or could also change the required password as a function of time/day etc. When the proximity-sensor interface system 102 reports a person to be present, and the alarm-variable is set, an alarm may be sounded and a message transmitted via the network or modem connection 165. Hence the method 500 provides a means for the present invention to add features to the basic screen saver activation control as described above.

Enhanced versions of the present invention are obtained when the optional third step 515 of the method 500 is employed. The third step 515 is most useful when used with enhanced proximity sensors. As discussed in connection with FIG. 1, the proximity sensor 105 may involve a plurality of different types of sensors arranged in a parallel configuration. For example, the proximity sensor 105 may be constructed using both a passive infra-red sensor and radio frequency identification transceiver. Such a sensor employs a plurality of different proximity sensor technologies to provide a multidimensional output. A multidimensional output involves two or more output signals produced by two or more sensors. In a multidimensional sensor, the individual sensors may be of the same or different types. An example of a multidimensional sensor using substantially identical sensors is an image sensor such as a charge coupled device (CCD) camera. A CCD camera provides a set of pixel values. Together the set pixel values constitute a video image. The set of pixel values may be processed to determine the characteristics of a scene as viewed by the CDD camera. In many cases, the standard computer 104 may come equipped with a CCD camera to support video conferencing and related applications.

In a preferred embodiment of an enhanced system, the method 500 is practiced using the proximity sensor 105 which is implemented as a multidimensional proximity sensor and is constructed using both an infra-red sensor and a first radio-frequency transceiver. In this embodiment, the second step 510 is operative to check the infra-red sensor to determine if a person in present in the vicinity of the computer 100. If the infra-red sensor detects the person to be present, the decision 512 evaluates to true and control passes to the third step 515. In the third step 515, the first radio-frequency transceiver is used to authenticate the identity of the detected person. For example, a security guard or an authorized user may wear a security badge with a second radio-frequency transceiver. The third step 515 is then operative to cause an encrypted message to be transmitted from the first radio-frequency transceiver. The second radio frequency transceiver located in the security badge then deciphers the message and produces an encrypted response. In one embodiment a plurality of encrypted messages are transmitted using a set of public keys for a set of authorized users. The third step 515 next sets a user-identification variable to indicate whether the detected person has been properly authenticated as an authorized user. In some systems the user-identification variable also indicates the specific identity of the detected person. Control next passes from the third step 515 to the fourth step 520. In the fourth step 520 an action is taken based on the user-identification variable. If the detected person did not pass the authentication process of the step 515, an alarm may be sounded and a message may be transmitted via the modem or network interface 165. If the detected person was identified as a security guard, no further action is taken. If the detected person is identified to be the authorized user of the computer system 100 other actions may optionally be taken as described below. If a usage monitoring system is employed, the identity of the user may be taken into account while gathering statistics. For example, if system 100 is shared by various users, the usage statistics monitoring program may keep track of productivity of individual users.

This aforementioned authentication system may be also be preferably used to allow a user to reenter a work area without the need to reenter a password into a screen saver. In one example system, the security policy of an institution requires users log out of their computers at night, but allows screen savers with password to be used during the day. The method the method 400A is thus modified by adding authentication logic to the decision 431. If the not-present counter indicates the user was away for at least the threshold amount of time, and the user has been properly authenticated as the authorized user, then a control variable is set. When control next passes to the step 420, the step 420 analyzes the control variable, and if it is set, deactivates the screen saver. In essence, the password is supplied by the second radio frequency transceiver located in the user's badge. If proper challenge and reply protocols are used, an eves dropper cannot intercept a transmitted password. This is because a different password is needed as a reply based on the encrypted challenge transmitted by the first radio frequency transceiver. This way the only way for an unauthorized user to be able to deactivate the screen saver is to get physical possession of the user's badge. This is equivalent to the user losing control of a physical key and deemed to be an acceptable risk in most environments. The automatic screen saver deactivation feature may also be automatically disabled during certain hours of the day using computer date/time clocking and a set of parameters to configure the system 100 to implement a given security policy.

Referring now to FIG. 6, a method 600 is illustrated to preprocess the outputs of low cost sensors to provide a reliable "person-present" indication. While the method 500 and the use of multidimensional sensors support high-end systems, there is also a need to support very low cost implementations. As such, the method 600 addresses the problem of using a low cost version of the proximity sensor 105 which can only detect a delta, i.e., a change in environment. For example, a reflective proximity detector (RPD) may be employed to provide a highly reliable proximity detection, but such sensors are more costly than passive infra-red sensors. An RPD sensor includes a source of illumination such as an infra-red transmitter and then measures the reflected signal level. A passive infra-red sensor is less expensive but is only reliable at detecting a delta such as when a change in heat occurs due to a person entering or leaving the area surrounding the computer system 100. A passive infrared sensor may be fooled especially in warm environments as the user moves about within the vicinity of the computer system 100. Thus without suitable preprocessing, the passive infrared sensor may not be able to provide a reliable "person present" indication as used in the decisions 310, 407 and 512. The method 600 is designed to process an input provided by a passive infra-red sensor so as to provide a reliable and low-cost "person-present" indication.

In a first step 605, a set of user values is sampled. The step 605 is preferably entered based on a timed interrupt such as a one-half second interrupt. In such an embodiment, the step 605 is entered every one-half second in response to a time-out signal. In some embodiments the method 600 may be incorporated into the logic of the step 305, 405 or 510. In such embodiments, a pass through the method 600 is allowed to run to completion before passing control from any of the steps 305, 405 or 510. The step 605 includes the sampling of the output of the proximity sensor 105. In some embodiments, the sampled values are passed through a filter such as a first order infinte-impulse response filter or a finite impulse response filter designed with a low-frequency passband using well known digital filtering techniques. Filtering differential values with a low pass filter tends to smooth the set of differential input-values to provide a set non-differential values. Control passes from the step 605 based on a decision 607. The decision 607 is affirmative if a mouse input has recently been detected. For example, the counter variable maintained in the steps 410 and 415 of the method 400 may be evaluated in the decision 607. If the mouse has recently been used, then control passes to a step 610 which sets the person-present variable to true. This step ensures the person-present variable will be properly set at power-up time when the user first boots the machine. Preferably the counter used in the steps 410 and 415 is initialized to a large value at power-up time. Also, when a user does provide an input to the computer system 100, the second step 610 assures the method 600 is reset into a correct and known state whereby the user is deemed to be present. Control next passes from the step 610 back to the step 605 through a delayed interrupt path. If the decision 607 detects that the no mouse input has recently been supplied, a second decision 612 is next evaluated. In the decision 612, the proximity sensor is checked to see if a change, i.e., a delta, has been detected which is above a threshold. A threshold is used to filter out false alarms caused by the user moving around within the work area. When the delta has been detected, control passes to a step 615. The step 615 is operative to toggle the state of the person-present variable. That is, when a large delta is detected, the state is toggled. For example, if the user has been involved in using the computer system 100, the person present variable will be properly set upon power-up. When the person becomes inactive and leaves the work-area, the person-present variable will change state to indicate no person is present. When the person reenters the work area, the person-present variable will toggle to indicate a person is once again present. In the event the system is fooled due to adverse conditions such as warm temperatures which mask large deltas, the system will be restored to a correct state whenever a keystroke or mouse input is detected due to the logic leading into the state 610. Hence such preprocessing allows a low-cost sensor such as a passive infrared sensor to be used to provide a reliable screen saver activation system.

In an alternative embodiment, the decision 607 checks to see whether a type of input other than a mouse input has been detected. For example, in some embodiments, the decision 607 is affirmative when a key on a keyboard has been recently used.

Although the present invention has been described with reference to a specific embodiment, other embodiments may occur to those skilled in the art without deviating from the intended scope. While many of the illustrative examples discuss embodiments using screen saver activation programs and screen saver display programs, the present invention applies to systems involving any activation program which controls the activation and/or deactivation of any computer program. Also, the method 400 does not need to be tied to a one-second interrupt but an interrupt based on any time-out period may be used. Also, the fourth step 420 of method 400 could cause a pixel movement other than the one-pixel up/down toggle. The multidimensional proximity sensor can also be configured using various combinations beside the infra-red sensor and the radio-frequency transceiver of the foregoing example. For example, a reflective proximity sensor could be used instead of the infra-red sensor. Lower cost radio frequency based sensors could be used. For example a simple low-cost transmitter could be located on the badge which transmits a given security code once per second and is inactive the rest of the time. Also, image and/or voice sensors may also be used. For example, if an image sensor is used, a face recognition module may be used to perform the user identification of the step 515 or the decision 431. Likewise a voice recognition speaker identification system may be used to allow a user to speak a password and have the password compared to the user's unique voice print. Also additional timer and filtering logic may be added to the method 600 to further enhance the ability of the passive infra-red sensor to reliably perform in this application. Therefore, it is to be understood that the invention herein encompasses all such embodiments which do not depart from the spirit and scope of the invention as defined in the appended claims.

What is claimed is:

1. Apparatus comprising:
    an interface module operatively couple able to provide input to a computer;
    a proximity sensor operatively coupled to said interface, said proximity sensor operative to detect the presence of a user; and
    a control module, said control module controllably coupled to said proximity sensor and said interface module, said control module having a state machine operative to cause information emulating a user input from a peripheral device of the computer to be transmitted to said computer via said interface module based on an output signal provided by said proximity sensor to prevent the activation of a computer program.

2. The apparatus according to claim 1, wherein said computer program is a screen saver program.

3. The apparatus according to claim 1, wherein said computer program is a password protection program.

4. The apparatus according to claim 1, wherein said computer program is an on-line connection program.

5. The apparatus according to claim 1, further comprising a timer, said timer being coupled to said control module, wherein said control module is operative to regulate when said information is transmitted based on data provided by said timer.

6. The apparatus according to claim 5, wherein said regulation causes said information to be transmitted at regular intervals when said proximity sensor detects said user to be present.

7. The apparatus according to claim 6, further comprising:

a coupling interposed between said control module and a user input-output device, said coupling operative to carry a signal indicative of the presence of an input produced by said user input-output device;

whereby said regulation further inhibits said information from being transmitted at regular intervals when said proximity sensor detects said user to be present and said control module detects said signal.

8. The apparatus according to claim 7, wherein said information comprises a mouse-data signal.

9. The apparatus according to claim 7, wherein said information comprises a keyboard-data signal.

10. The apparatus according to claim 1, wherein said control module is further operative to cause said information to be transmitted substantially when said proximity sensor detects a transition from said user not being present to said user being present.

11. The apparatus according to claim 1, wherein said output signal of said proximity sensor indicates a delta, and said control module is further operative to preprocess said output signal using a state machine to convert said delta into a user-present signal.

12. Apparatus comprising:

an interface module interpretable between a user-input device and a computer-input port of a computer, said interface module including a first connector connectable to said user-input device and a second connector connectable to said computer-input port;

a proximity sensor operatively coupled to said interface module, said proximity sensor operative to detect the presence of a user; and a control module, said control module controllably coupled to said proximity sensor and said interface module, said control module having a state machine operative to cause information emulating a user input from a peripheral device of the computer to be transmitted to said computer via said interface module based on an output signal provided by said proximity sensor to prevent the activation of a computer program.

13. The apparatus according to claim 12, wherein said computer program is a screen saver program.

14. The apparatus according to claim 12, wherein said computer program is a password protection program.

15. The apparatus according to claim 12, wherein said computer program is an on-line connection program.

16. The apparatus according to claim 12, wherein said user-input device is a computer-mouse device, said input port is a computer-mouse port, and said information comprises a data signal representative of a mouse movement.

17. The apparatus according to claim 12, wherein said user-input device is a computer-keyboard device, said input port is a computer-keyboard port, and said information comprises a data signal representative of a keystroke.

18. The apparatus according to claim 12, wherein said control module is further operative to pass a signal received from said first connector to said second connector and to monitor said signal to detect a user input.

19. The apparatus according to claim 18, wherein said control module further comprises a timer, and said control module is further operative to cause said information to be transmitted at regular intervals when said proximity sensor detects said user to be present.

20. The apparatus according to claim 19, wherein said control module is further operative to inhibit said information from being transmitted for a prespecified amount of time after said use input has been detected.

* * * * *